(12) United States Patent
Adler et al.

(10) Patent No.: US 7,975,727 B2
(45) Date of Patent: Jul. 12, 2011

(54) LINE FOR GUIDING A MEDIUM

(75) Inventors: Robert Adler, Gerasdorf (AT); Martin Stehrlein, Rust (AT)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 12/433,369

(22) Filed: Apr. 30, 2009

(65) Prior Publication Data

US 2011/0005735 A1 Jan. 13, 2011

(30) Foreign Application Priority Data

May 27, 2008 (DE) .......... 10 2008 025 226

(51) Int. Cl.
*F16L 11/00* (2006.01)

(52) U.S. Cl. ........ 138/114; 138/111; 138/149; 138/104; 165/154; 165/164; 62/393; 62/513

(58) Field of Classification Search .......... 138/104, 138/114, 111, 148, 149; 165/135, 154, 164; 62/393, 513
See application file for complete search history.

(56) References Cited

U.S. PATENT DOCUMENTS

| 2,475,635 | A |   | 1/1945  | Parsons |
|-----------|---|---|---------|---------|
| 3,269,422 | A | * | 8/1966  | Matthews et al. ............. 138/111 |
| 4,194,536 | A | * | 3/1980  | Stine et al. .................... 138/149 |
| 4,523,637 | A | * | 6/1985  | Abramo .................... 165/104.34 |
| 4,653,541 | A | * | 3/1987  | Oehlschlaeger et al. ..... 138/104 |
| 4,676,400 | A | * | 6/1987  | Lamont et al. .................... 222/1 |
| 5,076,242 | A |   | 12/1991 | Parker |
| 5,094,088 | A | * | 3/1992  | Davis .............................. 62/393 |
| 5,400,602 | A | * | 3/1995  | Chang et al. ................... 62/50.7 |
| 7,302,936 | B2|   | 12/2007 | Stolarz et al. |
| 7,802,445 | B2| * | 9/2010  | Winters .......................... 62/393 |
| 2005/0005986 | A1 | | 1/2005 | Topek et al. |

FOREIGN PATENT DOCUMENTS

| DE | 83 21 728 U1 | 12/1983 |
| DE | 37 03 841 A1 | 8/1988 |
| DE | 196 32 991 C1 | 1/1998 |
| EP | 1 705 050 | 9/2006 |
| GB | 2 290 848 A | 1/1996 |
| WO | WO 00/04321 | 1/2000 |

* cited by examiner

*Primary Examiner* — Patrick F Brinson

(74) *Attorney, Agent, or Firm* — Philip H. Von Neida

(57) ABSTRACT

An arrangement for guiding a medium, preferably compressed, gaseous hydrogen, is described. The arrangement encompasses a medium line, a cooling medium return line which surrounds the medium line, and a cooling medium feed line. The cooling medium return line and the cooling medium feed line are hereby preferably arranged in direct heat contact. The arrangement can furthermore be surrounded by a jacket tube.

6 Claims, 1 Drawing Sheet

FIGURE
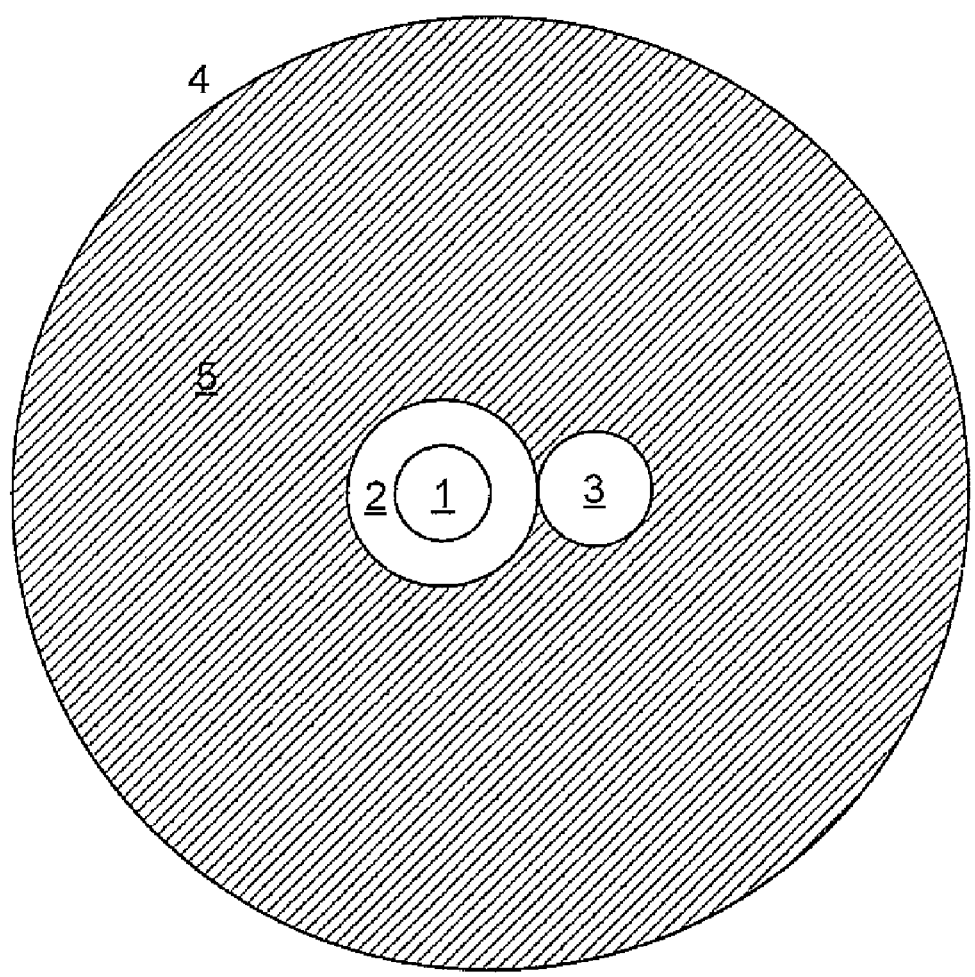

LINE FOR GUIDING A MEDIUM

BACKGROUND OF THE INVENTION

The invention relates to an arrangement for guiding a medium, preferably of compressed, gaseous hydrogen.

Generic arrangements for guiding a medium are used, for example, for hydrogen filling stations. The hydrogen, which is compressed to a pressure of between 25 and 900 bar, is hereby transported in gaseous form from the compressor to the dispensing and filling pump, respectively. Typically, the compressed hydrogen is hereby cooled down to a temperature of approx. −20° C. Typically, the distance and line length, respectively, between compressor/condenser and filling pump is between 1 and 70 meters. An undesired heating of the compressed hydrogen to ambient temperature is carried out in conventional lines, which are longer than 10 to 12 meters.

A heating of the compressed hydrogen to ambient temperate can also not be prevented by insulating such lines, because the hydrogen immediately releases its coldness to the medium line due to its high heat transition and draws the heat from the medium line.

To solve the afore-described problem, a cooling of the gaseous compressed hydrogen to a temperature of up to −640° C. is thus often realized. However, this is comparatively energy-intensive and does not lead to a success in response to correspondingly long lines.

SUMMARY OF THE INVENTION

It is the object of the instant invention to specify a generic arrangement or system for guiding a medium, which avoids the afore-mentioned problems and which provides for the transport of compressed, gaseous hydrogen, in particular, via a longer distance without heating the hydrogen.

To solve this object, a generic arrangement for guiding a medium is proposed, which encompasses a medium line, a cooling medium return line, which surrounds the medium line, and a cooling medium feed line.

According to the invention, the actual medium line, which serves to guide the compressed, gaseous hydrogen, for example, is now surrounded by a concentrically arranged cooling medium return line. A suitable coolant, for example thermo-oil, carbon dioxide and other suitable coolants, are guided in said cooling medium return line at a temperature of between −40 and −60° C., preferably of −45° C. in the counter current or direct current to the medium flowing in the medium line. Provided that provision is already made in the direct vicinity for a cold accumulator, for example for cooling the hydrogen, the cooling medium of this cold accumulator is preferably used as coolant.

The arrangement according to the invention furthermore encompasses a cooling medium feed line, which serves for supplying the cooling agent into the cooling medium return line and for discharging the cooling means out of the afore-mentioned line, respectively. The arrangement according to the invention for guiding a medium now provides for the transport of compressed, gaseous hydrogen via sufficiently long distances, as they are (must be) realized in practice, for example with hydrogen filling stations.

Further advantageous embodiments of the arrangement according to the invention for guiding a medium, which represent objects of the dependent patent claims, are characterized in that the cooling medium return line and the cooling medium feed line are arranged in direct heat contact, the arrangement is surrounded by a jacket tube, the jacket tube is embodied so as to be flexible, the space between jacket tube and cooling medium return line is at least partly, preferably completely filled with an insulating material, wherein polyurethane foam or Armaflex® is used as insulating material and/or provision is made for a vacuum insulation and provision is made within the jacket tube for means for fixing and/or stabilizing the medium line, the cooling medium return line and/or of the cooling medium feed line.

BRIEF DESCRIPTION OF THE DRAWINGS

The arrangement according to the invention for guiding a medium as well as further advantageous embodiments thereof will be defined in more detail below by means of the exemplary embodiment illustrated in the FIGURE.

DETAILED DESCRIPTION OF THE INVENTION

The FIGURE shows a cross section, which is not to scale, through the arrangement or system according to the invention for guiding a medium. It consists of the actual medium line 1, in which the medium to be guided flows, the cooling medium return line 2, which surrounds the medium line 1, as well as the cooling medium feed line 3.

Provision can furthermore be made for a jacket tube 4, which surrounds the afore-mentioned lines 1 to 3, and which is preferably embodied so as to be flexible. In an advantageous manner, the space between jacket tube and cooling medium return line is at least partly, preferably completely filled with an insulating material 5. Preferably, this insulating material 5 is a polyurethane foam or provision is made for a vacuum insulation.

The undesired heat incidence from the environment into the arrangement and into the medium line 1, respectively, is effectively weakened by means of such an insulation.

Means for fixing and/or stabilizing the medium line 1, the cooling medium return line and/or the cooling medium feed line 3 within the jacket tube 4, which are to be provided, if applicable, are not illustrated in the FIGURE.

Having thus described the invention, what we claim is:

1. An arrangement for guiding a medium comprising compressed gaseous hydrogen comprising a medium line, a cooling medium return line, which surrounds the medium line, and a jacket tube which surrounds the medium line and the cooling medium return line, and a cooling medium feed line, wherein said cooling medium return line and said cooling medium feed line are arranged in direct heat contact.

2. The arrangement according to claim 1, wherein the jacket tube is flexible.

3. The arrangement according to claim 1, wherein the space between jacket tube and cooling medium return line is at least partly filled with an insulating material.

4. The arrangement according to claim 3, wherein the space between jacket tube and cooling medium return line is completely filled with an insulating material.

5. The arrangement according to claim 3, wherein the insulating material is selected from the group consisting of polyurethane foam and vacuum insulation.

6. The arrangement according to claim 1, wherein provision is made within the jacket tube for means for fixing or stabilizing a line selected from the group consisting of the medium line, the cooling medium return line and the cooling medium feed line.

* * * * *